United States Patent [19]
Guilino

[11] 3,883,233
[45] May 13, 1975

[54] AUTOMATIC, RECORDING REFRACTOMETER

[75] Inventor: Gunther Guilino, Munich, Germany

[73] Assignee: Optische Werke G. Rodenstock

[22] Filed: Dec. 21, 1973

[21] Appl. No.: 427,114

[30] Foreign Application Priority Data
Dec. 22, 1972 Germany.......................... 2262886

[52] U.S. Cl. ...................... 351/6; 351/13; 356/124
[51] Int. Cl. ......................... A61b 3/10; G01b 9/00
[58] Field of Search .......... 351/6, 13; 356/124, 125, 356/126, 128; 250/200

[56] References Cited
UNITED STATES PATENTS
2,114,984  4/1938  Reason .................................. 351/6

3,524,702  8/1970  Bellows et al........................... 351/6
3,791,719  2/1974  Kratzer et al....................... 351/6 X
3,819,256  6/1974  Bellows et al........................... 351/6

*Primary Examiner*—Paul A. Sacher
*Attorney, Agent, or Firm*—Craig & Antonelli

[57] ABSTRACT

An automatic recording refractometer employs a pair of rotatable test figures, the image of one of which is projected into the retina of an eye being examined. The light from the retina then passes through a second test marker by way of a rotatable prism and is received by a photodetector. The electric signal output of the photodetector is analyzed by measurement circuitry and recorded. The test figures are rotatable in synchronism and may be relatively displaced. A fixation marker may also be imaged into the optical path of the light ultimately received by the photodetector.

11 Claims, 2 Drawing Figures

AUTOMATIC, RECORDING REFRACTOMETER

FIELD OF THE INVENTION

This invention relates to an automatic, recording refractometer for the determination of sight defects, wherein a rotatable test marker is imaged via at least one optometric lens into the eye and, by autocollimation, from the retina on an equally configured test marker, wherein a fixation marker is reflected into the beam path.

DESCRIPTION OF THE PRIOR ART

Refractometers are known wherein a displaceable test marker is imaged on the retina by means of an optometric lens, one focus of which is in the front primary plane of the eye being tested. The position of the test marker can be read off from a scale and is a measure for the sight defect. In order to determine such a defect objectively, it is customary practice to determine the sharp adjustment or the coincidence of the test figure on the retina by an observer, again through the optometric lens. For this purpose, a separate observation beam path is provided containing an ocular for an enlarged imaging of the retinal image. The observation through the eye media can be considerably impaired by reflections on the cornea. In this connection, it has been suggested to employ separate regions of the cornea for the test beam and the observation beam. The narrowing of the beams required thereby, however, reduces the brightness and the adjustment accuracy and limits the process to larger pupil diameters. In order to determine astigmatism and the position of the principal meridians thereof, the test marker has azimuthal symbols, e.g. in the form of a light cross and is rotatable about the optic axis.

In any event, when automatically determining visual anomalies, the entire range of probably occurring values of refraction must be scanned, i.e. approximately from +20 dpt. (diopters) to −20 dpt.; for each of these amounts, or from one step to the next of the range, the entire azimuth of 360° must be scanned. If the test marker is bilaterally symmetrical, then 180° is sufficient, of course. The steps of the range are to be dimensioned in accordance with the measuring accuracy and-/or in accordance with the accuracy with which the result will be further evaluated, for example in a prescription for eyeglasses.

The evaluation of the sharpness of the test image on the retina upon visual observation must be replaced, for a photoelectric indication of the sharpness optimum, by a comparative measurement of the light flux, in general. Most simply, this is accomplished, as is known, by imaging the picture of the test marker yielded by the eye in the same size and position onto a second test marker representing the negative of the former. In the case of an ideal image reproduction, no light flux is transmitted; this extreme value can be indicated or otherwise represented together with the setting of the device — position of the optometric lens, rotary position of the marker.

However, in practice, it is impossible to attain a zero value for the light flux, since a strong reduction in contrast is caused not only especially by reflections, but also by dispersion and refraction in and on the eye media. An accurate measurement would be impossible under these testing conditions.

OBJECTS OF THE INVENTION

It is an object of this invention to provide a device for determining the refractive condition of an eye, which device fixes the measured value by analog or digital indication without subjective data provided by the person being tested and without any influence being exerted by the testing personnel.

BRIEF SUMMARY OF THE INVENTION

This object is attained by providing that one of the test markers and the image reproduced thereon or by the test marker are movable by optical means with respect to each other along the lines of a periodic change of the light flux.

The refractometer of this invention detects the refractive conditions, including the extent of astigmatism with respect to strength and axial position by a programmed operation of its adjustment elements as extreme values of the focus of images and then makes the adjustment data visible by writing, digital indication, or the like.

In the device of the present invention, the image of the test marker reflected from the background of the eye and the negative of the test marker positioned in its plane are moved with respect to each other, namely in a discriminating, i.e. light-modulating, manner. The light flux then varies regarding the local brightness differences provided by the retinal image, but remains constant with respect to the proportions provided by reflections. Accordingly, an automatically recording refractometer of this invention is characterized in that a test marker and the optical test marker image reproduced thereon are moved with respect to each other by optical means.

Thus, the light flux emanating from the device and received by a photoelectric receiver consists of a constant component and a component which is variable with respect to time; both are separated by conventional electrical means prior to indication and processed so that consideration is given to the ratio of the alternating component to the constant component, i.e. the degree of modulation. The position of the test marker at which the maximum degree of modulation is attained characterizes the refractive value, and the magnitude of the degree of modulation characterizes the transparency of the eye media. It is especially advantageous that the full opening of the pupil of the eye being tested is utilized for the entrance of the light beam, as well as for the photometric evaluation of the retinal image. Consequently, testing conditions are created which far better correspond to natural vision then possible with the conventional processes requiring a division of the pubil. A linear grating is suitably employed as the test marker, the transparent and opaque lines of which are equally wide, so that the image of the slot projected upon the bars is completely covered and, in the ideal case, no light flux is transmitted. In this connection, a single linear grating can be effective in full autocollimation, wherein the separation of the beam paths from the light source, on the one hand, to the photoelectric receiver, on the other hand, lies outside of the light path between the test marker and the eye; however, in order to obtain the light modulation, it is necessary to employ two identical test markers, of which the marker closer to the light source is imaged upon the other marker, and it is necessary to separate the beam paths by means of a partially transmissive reflector between the optometric lens and the test marker farther away from the light source.

The test markers can rotate synchronously about the optical axis in order to detect the azimuthal position of the astigmatism. The test image can be set into periodic movement on the test marker by arranging a rotating prism in the beam path, imparting to the image a deflection with an amplitude resulting in a maximum alternating light component. The prism can exert the deflecting effect by refraction or by optional multiple reflection. It is also possible to provide an oscillating mirror.

Accordingly, the device has three motions which should be executed with maximally different, incommensurable frequencies, i.e.:

1. The displacement of the test markers, representing a structural unit with the field lenses, for setting the value of refraction.

2. The rotation of the test marker for setting the principal meridian position. 3. The rotation of the prism which determines the frequency of the alternating light component and is to take place comparatively rapidly. The rotational frequency of the rotary prism is not to represent a harmonic of the other frequencies or of the mains frequency.

The eye to be tested is to be provided with a fixation marker determining its accommodation, as well as the alignment of its visual axis. The image of this marker is likewise reproduced, by way of the eye, onto the rotating negative of the test marker, but must not contribute a measurable amount to the alternating light. Thus, the marker must be without azimuthal characteristics, i.e. it is to consist especially of a dot or suitably of concentric rings. The image of the marker is advantageously projected into the eye via a beam splitter; in this connection, it is possible to replace the fixation marker, together with the associated illumination unit, by an ocular in order to control the imaging of the test marker on the retina.

DETAILED DESCRIPTION

Figure 1:
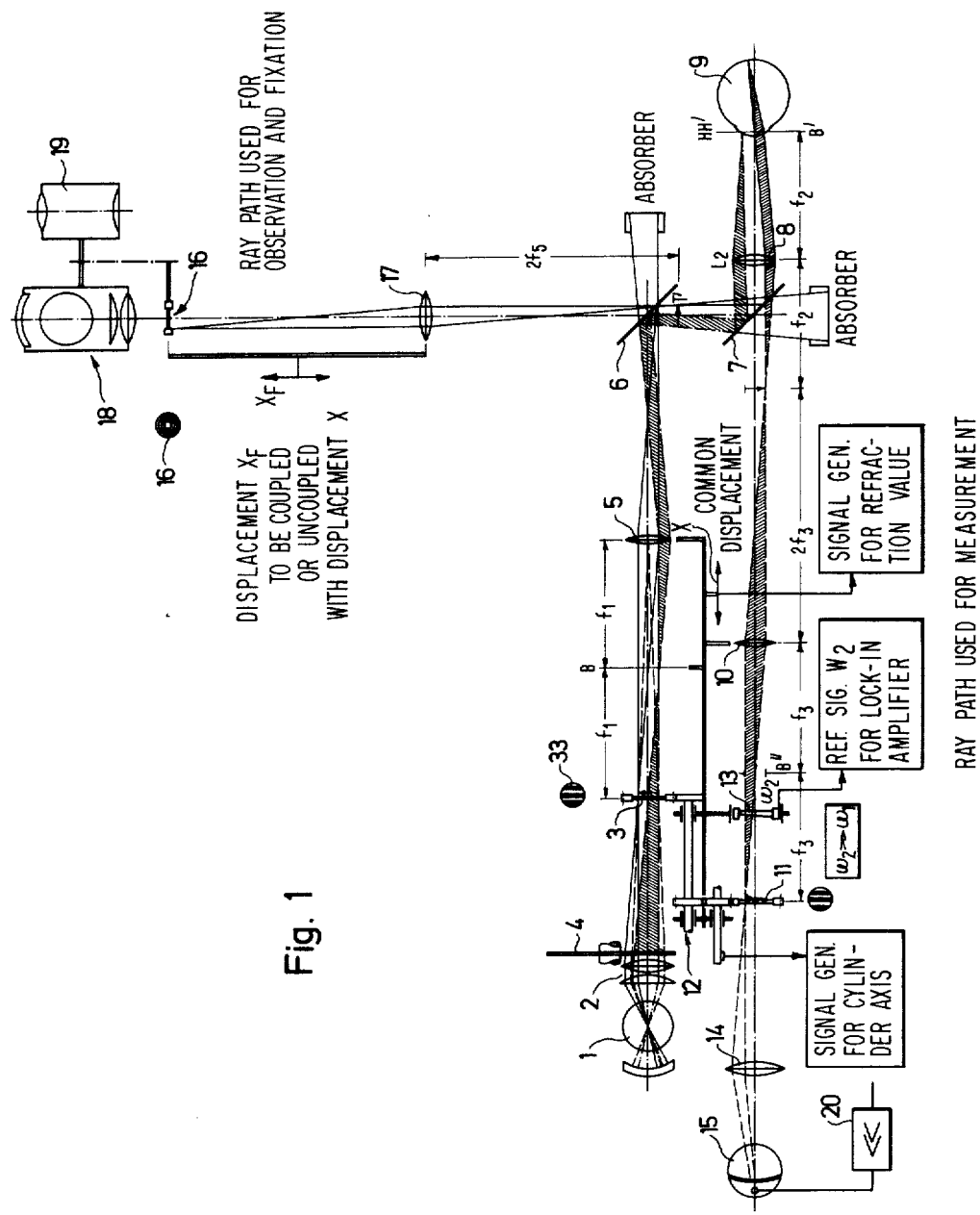
FIG. 1 shows a schematic illustration of the mechanicooptical part of a device according to the present invention.

In FIG. 1, the light source 1 provides a beam which, via the condensor 2, impinges upon a test marker 3 consisting of a linear grating as shown in a top view at 33. Optic light (Gray) filters or color filters can be inserted with a revolving disk 4. The test marker 3 is imaged, as in any conventional refractometer, via the commonly displaceable field lens 5 of focal length $f_1$ and another fixed optometric lens 8 of local length $f_2$ and via the two partially transmissive mirrors 6 and 7, onto the retina of the eye 9 to be tested. In accordance with the visual anomalies of the eye 9, the test image is focused on the background of the eye by a common displacement X of the lens 5 and marker 3. The retinal image is imaged in autocollimation via the optometric lens 8, as well as by the field lens 10 of focal length $f_3$ displaceable synchronously with lens 5, in the plane of the second test FIG. 11, representing a negative of 3. Both markers 3 and 11 are oriented in the same direction and can be set into a rotation of frequency $\omega_1$ together by means of the gear unit 12. A deflecting prism 13 rotates at a substantially different, especially higher, speed of rotation, e.g. $\omega_2 \approx 2\pi \, 0.87\text{cps}$, so that the image of the marker 3 executes a circular movement on grating 11. The component of this motion in parallel to the lines of the grating remains ineffective with respect to the light modulation, just as the light flux proportions caused by reflections etc.; the motion component at right angles to the lines of the grating yields an alternating light, the frequency of which is determined by the speed difference between the gratings 3 and 11, on the one hand, and the number of cycles swept during the motion, on the other hand. The entire light flux is transmitted by means of the lens 14 and optionally additional optical elements to the photodetector 15; the objective to be achieved in this connection is to obtain an illumination of the photodetector independently of the refraction setting.

Figure 2:
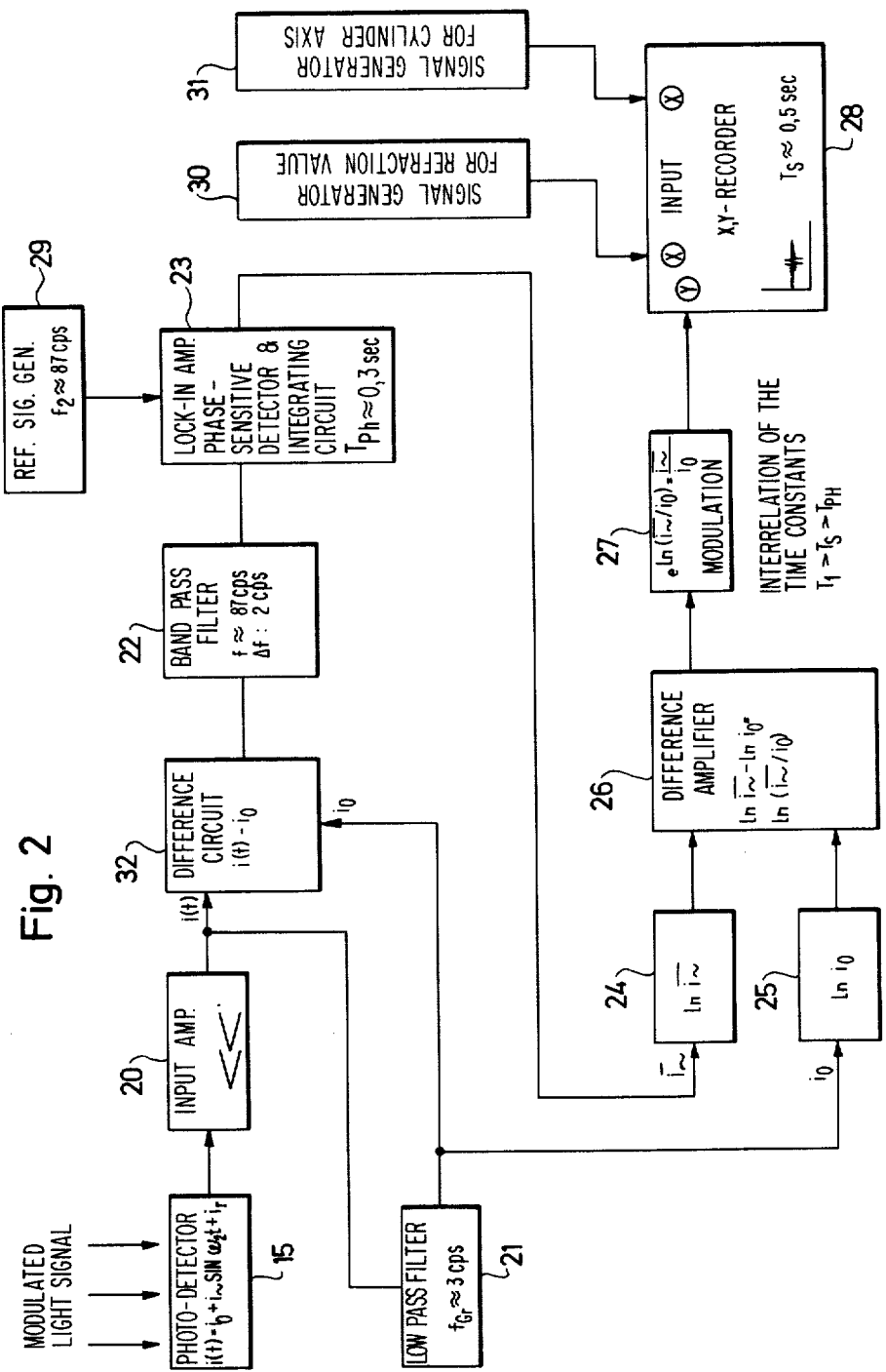
FIG. 2 is a block circuit diagram of the electronic section of the device.

The evaluation of the signal received by the detector 15 is illustrated in a block circuit diagram in FIG. 2.

Suitably, the light signal $i(t)$ is separated into the direct ($i_o$) and alternating ($i_\sim$) light components by electronic means, namely after the input amplifier stage 20. The signal is conducted via a low-pass filter 21 with a cut-off frequency $f_{GT} \approx 3\text{cps}$ which transmits only those components which vary very gradually with respect to time, i.e. the direct light signal component is isolated.

When forming, in different circuit 32, the difference $i(t) - i_o$ between the input signal $i(t)$ and the direct light proportion thereof, the alternating light signal should theoretically be the result. However, since the device is designed, inter alia, in such a manner that the person tested is not to be dazzled by the fixation marker, and the test marker, furthermore, has a substantially lesser brightness, the thus-received light signal is so weak, in spite of the use — according to the most recent state of the art — of a highly sensitive, low-noise photodetector 15 and input amplifier 20, that it contrasts only slightly from the background noise $i_r$ caused by these elements. This is the case particularly for the alternating light component. For this reason, this actually desired signal is first filtered by means of a narrow band-pass filter 22 of a bandwidth $\Delta f = 2\text{cps}$ and a center frequency $f \approx 87\text{cps}$, then fed to a phase-sensitive-detector 23 (lock-in amplifier, the time constant $T_{PH} \approx 0.3$ sec of which is adapted to the cut-off frequency of the low-pass filter 21), and in this way distinguished from the background noise. The mode of operation of the phase-sensitive-detector 23 requires a special signal generator 29 for deriving the phase position of the rotary prism 13.

The degree of modulation, here defined as the quotient of the integrated alternating light signal $\overline{i_\sim}$ over the direct light signal $i_o$, is obtained by establishing the logarithmic $\ln \overline{i_\sim}$ and $\ln i_o$ in circuits 25 and 25, the difference between $\ln \overline{i_\sim}$ and $\ln i_o$ in the differential amplifier stage 26, and subsequent forming of the anti-logarithm $\exp(\ln(\overline{i_\sim}/i_o))$ in stage 27. The value can be recorded by means of XY-Recorder 28, by means of a digital indicator, or the like.

By a mechanical drive, the lenses 5 and 10 are moved comparatively slowly along the optical axis in both directions, so that the customary range of visual ametropia (−20 dpt. to +20 dpt.) or another desired range is periodically swept. The test marker pair 3 and 11 rotates at a suitable frequency; this pair must execute at least half a rotation upon the displacement of lenses 5 and 10 by an amount expressed in diopters corresponding to the inaccuracy of the measurement, for example 0.1 dpt. The prism 13 rotates at a considerably higher frequency. This frequency must cause an alternating light component independent of the azimuth of the test marker 3 and 11, if no astigmatism of the eye is present. Conventional indicating units have not been illustrated, for example an XY-Recorder, one axis of which corresponds to the movement of the lenses 5 and 10 (displacement $x$), and the other axis of which represents the degree of modulation of the signal received by the detector 15.

The mechanical movement of the lenses 5 and 10 is converted, via a signal generator 30 which can be, for example, a linear potentiometer, into an electric signal in order to control one of the axial settings of the recording unit 28.

If the modulation governing for the focusing of the test marker 3 on the retina of the eye is a maximum, a marked peak rising from the usually straight course of the curve is recorded, for example. For an eye 9 showing astigmatism, two maxima of the modulation are found, the test marker azimuths of which differ, in the normal case, by 90°. The azimuth of the more strongly negative principal meridian, for example, indicates the (plus-) cylinder axis of the value of refraction and can be indicated by way of a signal generator 31 in an analog or digital manner, for instance by a transparent graduated scale connected to grating 3 or 11, which is transilluminated at the maximum of the alternating light by means of a light source controlled thereby; it is also possible to print out the measured value directly on a recording unit, e.g. 28.

In order to fix the visual axis and accommodation of the eye 9, the fixation marker 16, representing concentric rings, is imaged through the splitter mirror 6 via the axially displaceable field lens 17 of focal length $f_s$ into the eye 9.

The displacement $X_F$ of the fixation marker 16 and the field lens 17 can be mechanically coupled with the displacing mechanism for the adjustment of the refraction, consisting of field lenses 5 and 10, test markers 3 and 11, as well as rotary prism 13. In this connection it is advantageous, especially for the far point refraction, to adjust the fixation marker 16 and field lens 17 somewhat myopically with respect to the test marker 3 and field lens 5. In the case of hypermetrope test persons, a relaxation of the accommodation is stimulated in this way.

The fixation marker 16 is illuminated by the illumination unit 18 which can be replaced by the ocular 19; this possibility provides that the image on the retina of the eye 9 can be observed in a conventional manner and the function of the entire device can be monitored.

While I have shown and described one embodiment in accordance with the present invention, it is understood that the same is not limited thereto but is susceptible of numerous changes and modifications as known to a person skilled in the art and I therefore do not wish to be limited to the details shown and described herein, but intend to cover all such changes and modifications as are obvious to one of ordinary skill in the art.

What is claimed is:

1. An automatic, recording refractometer for determining visual defects comprising:

first means for directing the image of a first rotatable test figure along a first prescribed optical path into the eye;

second means for directing the image from the retina of the eye along a second optical path through a second rotatable test figure;

third means for projecting the image of a fixation marker into said second optical path;

fourth means, responsive to light passing through said second rotatable test figure from the eye, for providing a measurement of visual anomalies of the eye;

fifth means, coupled to said test figures, for effecting a relative displacement of said test figures in such a way that the image of the first rotatable test figure reflected from the retina of the eye under examination is focused on the second rotatable test figure; and sixth means for coupling the displacement of said fixation marker in an optional manner with said fifth means.

2. An automatic, recording refractometer according to claim 1, wherein each of said test markers comprises a grating which is rotatable about an optical axis passing therethrough synchronously with the rotation of the other test marker.

3. An automatic, recording refractometer according to claim 1, further including a rotating prism disposed in said second optical path for displacing the image of said first test marker on said second test marker.

4. An automatic, recording refractometer according to claim 1, wherein said fixation marker includes means for projecting a set of concentric circles into said second optical path.

5. An automatic, recording refractometer according to claim 1, further including means for adjusting the brightness of the test markers and said fixation marker relative to each other.

6. An automatic, recording refractometer according to claim 1, further including means for effecting observation of the image in the retina of the eye along the optical path by which said fixation marker is projected.

7. An automatic, recording refractometer according to claim 2, further including a rotating prism disposed in said second optical path for displacing the image of said first test marker on said second test marker.

8. An automatic, recording refractometer according to claim 7, wherein said fourth means comprises a photodetector which receives the light passing through said second rotatable test marker and converts the received light into an electrical signal, a filter circuit for separating said electric signal into prescribed frequency components, and means for combining said frequency components in accordance with a selected function for generating an indication of the measurement of the visual defects.

9. An automatic, recording refractometer according to claim 8, wherein said filter circuit comprises a low-pass filter coupled to said photodetector, a first difference circuit for subtracting the output from said photodetector and said low-pass filter, a band-pass filter coupled to said first difference circuit, and an integrating phase-sensitive detector synchronized with the frequency of rotation of said rotary prism for eliminating background noise from the output of said difference circuit.

10. An automatic, recording refractometer according to claim 9, wherein said means for combining said generating an indication includes means for generating a signal representative of the ratio of the output of said low-pass filter and said integrating phase-sensitive detector and a recorder coupled to receive said ratio signal and signals representative of the rotation and displacement of said first and second rotatable test markers.

11. An automatic, recording refractometer according to claim 3, wherein the frequency of rotation of said prism is greater than the frequency of rotation of said first and second test markers.

* * * * *